(No Model.) H. A. BARNARD. 2 Sheets—Sheet 1.
RICE HULLING MACHINE.
No. 586,090. Patented July 13, 1897.
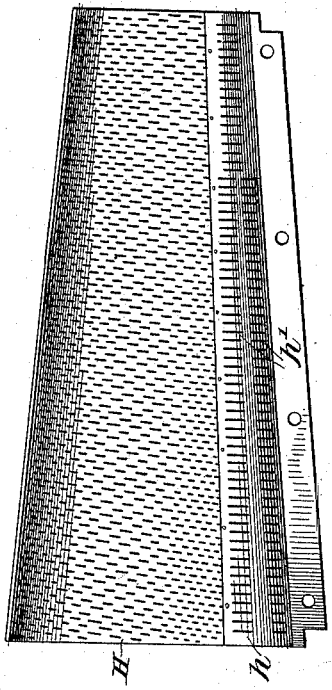
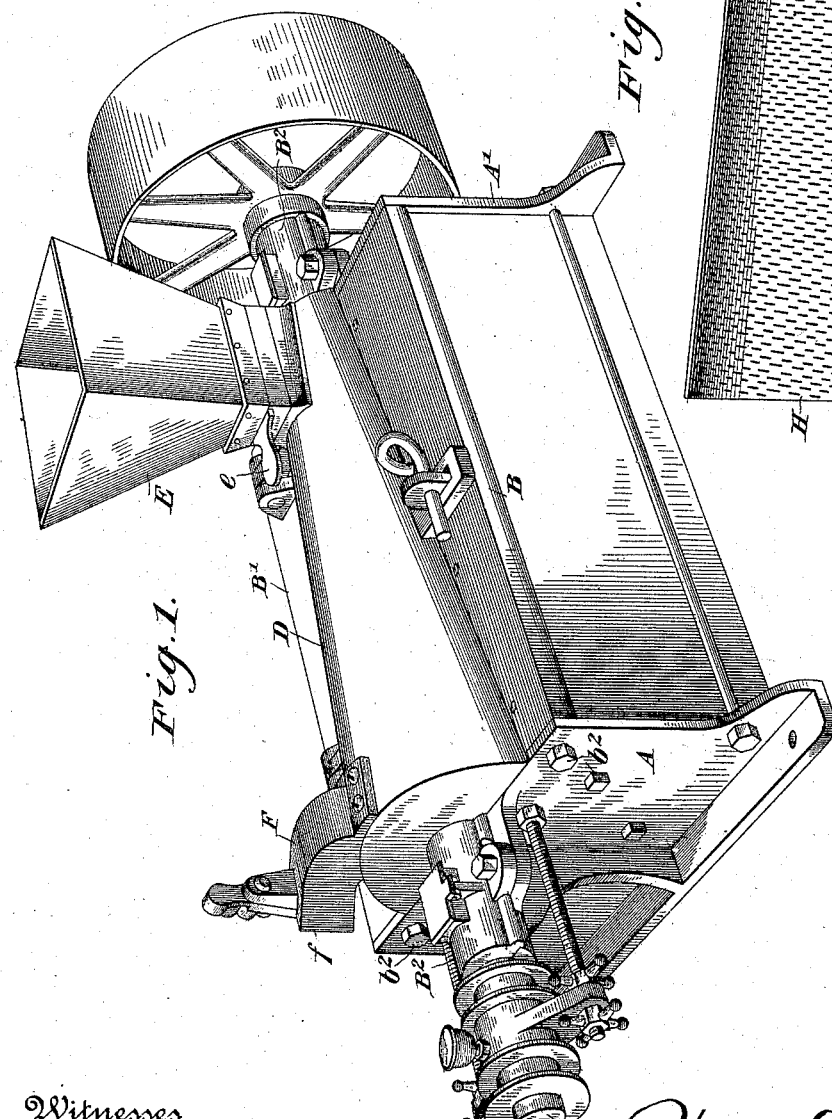

(No Model.) 2 Sheets—Sheet 2.

H. A. BARNARD.
RICE HULLING MACHINE.

No. 586,090. Patented July 13, 1897.

Witnesses
J. M. Witherow
James R. Mansfield

Inventor
Herman A. Barnard
By Alexander H. Dowell
Attorneys

UNITED STATES PATENT OFFICE.

HEMAN A. BARNARD, OF MOLINE, ILLINOIS, ASSIGNOR TO THE BARNARD & LEAS MANUFACTURING COMPANY, OF SAME PLACE.

RICE-HULLING MACHINE.

SPECIFICATION forming part of Letters Patent No. 586,090, dated July 13, 1897.

Application filed December 30, 1896. Serial No. 617,485. (No model.)

*To all whom it may concern:*

Be it known that I, HEMAN A. BARNARD, of Moline, in the county of Rock Island and State of Illinois, have invented certain new and useful Improvements in Rice-Hulling Machines; and I hereby declare that the following is a full, clear, and exact description thereof, reference being had to the accompanying drawings, which form part of this specification.

This invention is an improvement in rice-hulling machines; and its object is to remove the hulls, cuticle, and gummy coatings from the rice-grains, so as to clean the same ready for use, and to so construct the machine that, as compared with those hitherto used, it will have greater capacity and efficiency, while it will also be of simple and economical construction.

To this end the invention consists in the novel construction and combinations of parts in the machine illustrated in the accompanying drawings and hereinafter summarized in the claims.

Figure 2:
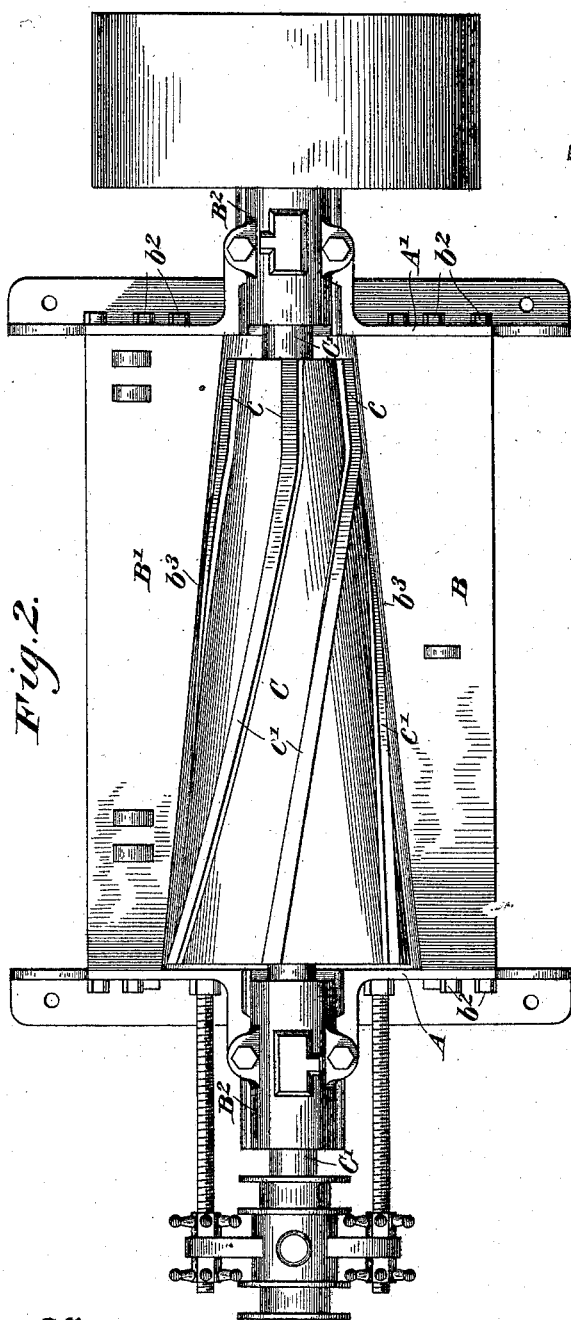
Figure 4:
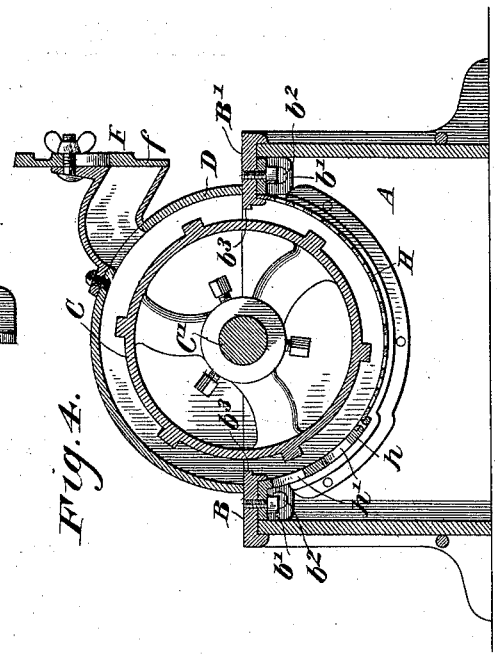
Figure 3:
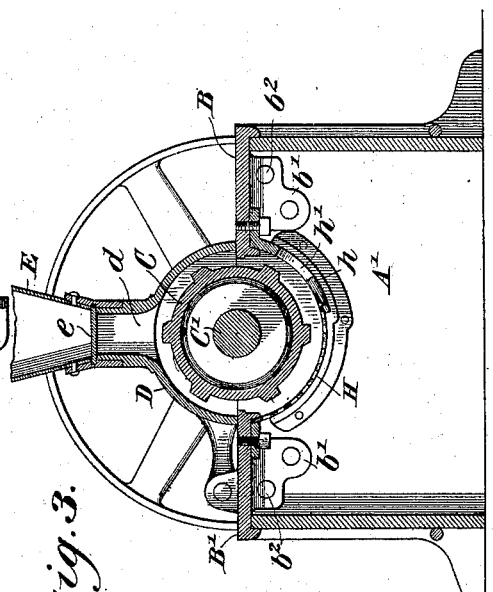

Referring to the drawings, Figure 1 is a perspective view of the complete machine. Fig. 2 is a top plan view with the upper half of casing removed. Fig. 3 is an enlarged transverse section through the hopper end of the machine, looking toward the driving-pulley; Fig. 4, a similar section through the discharge end and looking away from the driving-pulley, and Fig. 5 is a view of the cast-iron portion of the lower half of casing detached.

The frame of the machine is formed of four pieces, to wit: two end pieces A A' and two top plates B B', which are provided with perforated lugs $b'b'$ at their ends, by which they are secured to the end plates by bolts $b^2$, as shown. The inner sides of these plates are beveled longitudinally, as shown, so that they are widest at the receiving end and narrowest at the discharge end of the machine, thus leaving a conoidal-shaped opening between the plates, which is occupied by a truncated ribbed hulling-cone C, mounted on a longitudinal shaft C', journaled in boxes $B^2$, exterior to the end plates. The lower halves of these boxes may be cast integral with the end plates. The casing of the machine is also conical and is formed of an upper imperforate part and a lower perforated part. The upper part D is hinged to plate B' and can be fastened in closed position, as indicated in the drawings, or in other desired manner. Near the smaller end and top side of part D is a feed-opening $d$, over which is a feed-hopper E, provided with a regulating-valve $e$.

At the larger end of part D and near its top is a discharge-spout F, provided with an adjustable gate $f$, by which the escape of cleaned rice can be regulated.

The lower half of the casing is composed of a longitudinal cast-iron strip $h$ and perforated sheet-metal portion H, the cast-iron portion being at the side toward which the cone C rotates, and consequently where the greatest pressure on and abrasion of the lower part of casing occurs. In practice this abrasion is found so excessive as to quickly destroy sheet metal at that point, so I insert the strip of cast-iron $h$, with chilled openings $h'$ therein, which insures greater durability.

The strip $h$ is bolted at top to plate B', and the lower side edge of part H is riveted to the lower edge of strip, as shown.

It will be observed that the inner edges of plates B B' project into the interior of the casing, so as to form two diametrically opposite shelves or retarding-ribs $b^3$ inside the casing. In a machine with a casing about thirty inches long and fourteen inches wide at its largest (discharge) end these ribs project about a quarter or half an inch inward and extend the entire length of the casing.

The inner edges of the plates B B', forming the ribs $b^3$, are preferably chilled, so as to withstand the excessive amount of abrasion to which they are subjected.

The ribbed cone is slightly smaller in diameter than the space between the retarding-ribs $b^3$, so as to leave a narrow slot or space for the rice to pass between the cone-ribs and the retarding-ribs, thus avoiding crushing or grinding of the grain. The cone is also slightly shorter than the interior of the casing, so that it can be adjusted longitudinally therein by means of suitable adjusting devices—for instance, such as are shown attached to the outside of the end piece at the discharge end of the machine—by which the shaft and cone can be adjusted longitudinally in their bearings. These adjusting devices are not claimed herein.

An important point in the present invention is the arrangement of the ribs on the cone C. It will be noted that at the smaller end of cone the ribs extend parallel with the shaft C for a few inches, so as to underlie the feed-opening in the casing. This arrangement of parts c of the ribs, owing to the taper of the cone, results in the ribs themselves gradually diverging, so that they will accelerate the feed of grain into the machine. The main portions c' of the ribs, however, extending from parts c to the rear or larger end of cone, are straight, but arranged diagonal to the shaft C. Consequently they lie diagonally on the surface of the cone and diverge, their rear ends being considerably farther apart than their front ends. The object of this peculiar arrangement of ribs will be made apparent hereinafter.

The operation is as follows: The rice is fed between the cone and the conical casing at the small end thereof. Its progression from the feed to the delivery is accelerated by the contour of the casing, while the ribs on the cone are so arranged and revolved as to counteract this progression in a measure and produce a gyrating movement of the rice and prevent its passing too fast through the machine. Thus the body of the rice has a positive centrifugal motion and positive longitudinal motion in the casing, and at the same time the grains of rice have a gyrating movement upon and among themselves, whereby they are caused to rub continuously against each other, removing the hulls and gummy matters, and this gyratory motion increases as the grains near the discharge end of the machine, owing to the increased speed of centrifugal movement of the body of rice. The ribbed truncated cone must be revolved, so that the ribs on its surface will act to convey the material toward the feed end, thus preventing the material from passing too fast through the machine, and also to cause by their action, in conjunction with that produced by the contour of the case, the gyratory motion to the material when in operation. A lower casing made entirely of perforated sheet-steel is not durable, and one entirely of cast-iron cannot be made with sufficient openings. Hence by a combination of the two I place the cast-iron where the greatest wear occurs and the sheet-steel for the balance of the casing, and thus provide ample ventilation and obtain the greatest durability.

It will be obvious from the foregoing description and drawings that the plates B B' serve both as girders of the frame and as retarding plates or ribs within the casing.

Having thus described my invention, what I therefore claim as new, and desire to secure by Letters Patent thereon, is—

1. In a rice-hulling machine the combination with the casing and a rotating hulling member, of top plates for the casing, having their inner edges projecting therein whereby said plates are utilized for the double purpose of girders to bind the frame together and as retarders to the grain while being operated upon by the revolving member, substantially as herein set forth.

2. The combination in a rice-hulling machine with a truncated cone, of a casing, having stationary top metal plates located one on each side of the truncated cone, and adapted to serve as retarders to the grain when subjected to centrifugal action by the revolution of the cone, all adapted to operate substantially as described.

3. In a rice-hulling machine having a feed-opening at its smaller end and a discharge-opening at its larger end, of a revolving hulling member, provided with ribs adapted to operate upon the grain substantially as set forth, of top plates one on each side of the hulling member, their inner edges projecting in the casing for the purpose of retarding the grain in its revolutions, all constructed and arranged to operate substantially as specified.

4. In a rice-hulling machine the combination of the frame consisting of end pieces and horizontal connecting-plates, and a revolving ribbed truncated cone intermediate said plates; with a casing formed in halves located above and below said plates so that the inner edges of the latter form inwardly-projecting ribs for retarding the centrifugal motion of the grain in the casing, substantially as and for the purpose described.

5. A frame for a rice-huller comprising two end pieces and two metal plates securely fastened to the tops of the end pieces and having their inner sides beveled so as to have a tapering space between them in combination with a ribbed truncated cone; and a casing composed of upper and lower halves separated by said plates, the inner edges of said plates projecting into the casing so as to form retarding-ribs therein, all substantially as and for the purpose described.

6. In a rice-hulling machine the combination of a truncated cone and an inclosing conical casing consisting of a semicircular imperforate top casing and a perforated lower casing, composed partly of perforated sheet metal and partly of cast-iron with chilled openings, in combination with metal plates located between the upper and lower half of the casing, so as to form inwardly-projecting ribs inside of said casing, substantially as and for the purpose described.

7. In a rice-huller, the combination of the conical casing having a feed-opening at its smaller end, and a discharge-opening at its larger end; with a cone within the casing provided with ribs so formed that the parts of the ribs on the small end of the cone under the feed-opening will assist in forwarding the grain through the casing, while the main portions of the ribs are arranged diagonally so as to hold back the grain; and opposite retarding-ribs projecting into the casing, all substantially as and for the purpose described.

8. The herein-described rice-hulling machine, consisting of the end pieces, the top plates connected thereto and having their inner sides beveled, substantially as described; and a conical two-part casing, the upper part being imperforated but provided with feed and discharge openings, and supported on said plates, and the lower part being perforated and suspended from said plates, the casing being of such diameter that the inner edges of the plates project into the casing and form ribs therein adapted to retard the centrifugal movement of the grain; with a rotary cone within the casing provided with ribs arranged parallel with the axis of the cone at its small end and diagonal to the axis of the cone on the larger portion thereof, all substantially as and for the purpose described.

In testimony that I claim the foregoing as my own I affix my signature in presence of two witnesses.

HEMAN A. BARNARD.

In presence of—
W. R. MOORE,
H. E. MOOREHEAD.